(12) United States Patent
Ito

(10) Patent No.: US 6,269,588 B1
(45) Date of Patent: Aug. 7, 2001

(54) FLOWER POT FOR GROUP PLANTING

(76) Inventor: Shoko Ito, 5-11, Kasuga 4-chome, Ibaraki-shi, Osaka-fu (JP)

( * ) Notice: Subject to any disclaimer, the term of this patent is extended or adjusted under 35 U.S.C. 154(b) by 0 days.

(21) Appl. No.: 09/376,303

(22) Filed: Aug. 18, 1999

(30) Foreign Application Priority Data

Sep. 18, 1998 (JP) .................................................. 10-283533

(51) Int. Cl.⁷ ...................................................... A47G 7/00
(52) U.S. Cl. ............................................................... 47/39
(58) Field of Search ................................ 47/41.01, 41.11, 47/39, 67

(56) References Cited

U.S. PATENT DOCUMENTS

| 2,746,208 | * | 5/1956 | Lewis ........................................ 47/39 |
| 3,108,401 | * | 10/1963 | Richardson ............................... 47/39 |
| 5,311,700 | | 5/1994 | Thomas . |
| 5,438,797 | | 8/1995 | Lendel . |
| 5,450,691 | | 9/1995 | Christie et al. . |
| 5,606,824 | | 3/1997 | Ruibal . |

FOREIGN PATENT DOCUMENTS

| 296 12 044 | | 9/1996 | (DE) . |
| 2165143 | * | 4/1986 | (GB) ........................................ 47/39 |
| 7-53473 | | 12/1995 | (JP) . |
| 8-140481 | | 6/1996 | (JP) . |
| 2529281 | | 12/1996 | (JP) . |
| 94/10886 | * | 5/1994 | (WO) ........................................ 47/67 |

\* cited by examiner

*Primary Examiner*—Thomas Price
(74) *Attorney, Agent, or Firm*—Wenderoth, Lind & Ponack L.L.P.

(57) ABSTRACT

A flower pot for group planting of flower plants or the like which is mounted on a pole comprises a flower pot body (1) having planting openings (6) of which upper part is opened and provided in a plurality of locations in the periphery of said body (1), and having a hole (8) provided in the bottom of said body for inserting the pole; and a cylindrical mounting member (2) for inserting the upper part of said pole, at least the bottom of said mounting member is opened and said mounting member is fixedly or removably mounted vertically around said hole (8).

The outer face of said flower pot is covered by the group planted flower plants and not exposed when said flower pot in which flower plants have been group planted is mounted on the pole, and accordingly the beauty of the flowers planted in said flower pot is kept well and the decoration effect is increased, and said flower pot is securely mounted on the pole and accordingly does not fall even when subjected to strong winds.

11 Claims, 8 Drawing Sheets

FLOWER POT FOR GROUP PLANTING

1. Technical Field

The present invention relates to a flower pot for group planting of flower plants or the like which is mounted on a pole, and more particularly to a flower pot for group planting of flower plants or the like in which the flower plants or the like have been beautifully group planted may be safety and securely mounted on the upper part of a pole having a height nearly equal to the level of human eye and normally installed outdoors at suitable places on the streets, in the parks or the like and which is useful for not only beautifying the streets, the parks or the like but also delighting eyes and hearts of pedestrians.

2. Background Art

It has been a conventional practice from old time to place on the streets, in the parks or the like flower pots in which flowers have been planted at a level which is a little lower than the level of human eyes to not only beautify the streets, parks or the like but also delight the eyes of pedestrians.

For this purpose, it has been general to plant flowers in flower pots with long legs or to place on the streets or in the parks a legged body comprising a lower seat and an upper tray having legs and to place on said tray flower pots in which flowers have been planted.

However, in either case, the flowers are planted simply in an ordinary flower pot so that there is a problem that the beauty of the flowers planted in the flower pot is spoiled considerably and hence the decoration effect is decreased because the exposed outer face of the flower pot is directly faced to the pedestrians when the flower pot is placed at the level nearly equal to the level of human eyes, and in the latter case, there is a problem that the flower pot can fall from the tray by strong winds, etc. and is broken.

DISCLOSURE OF THE INVENTION

This invention has been made to eliminate said problems, and it is an object of this invention to provide a flower pot for group planting of flower plants or the like which is mounted on a pole and brings about advantages that the outer face of the flower pot is not exposed when the flower pot in which flowers have been planted is mounted on the upper part of a pole having a height nearly equal to the level of human eyes, and therefore, the beauty of the flowers planted in the flower pot is kept well and the decoration effect is increased, and that the flower pot is mounted securely on the pole and accordingly does not fall even when subjected to strong winds.

In order to eliminate said problems and to accomplish said object, this invention provides a flower pot for group planting of flower plants or the like which is mounted on a pole, comprising a flower pot body having planting openings of which upper part is opened and provided in a plurality of locations in the periphery of said body, and having a hole provided in the bottom of said body for inserting said pole; and a cylindrical mounting member for inserting the upper part of said pole, at least lower part of the bottom of said mounting member being opened and said mounting member being fixedly mounted vertically around said hole, and a flower pot for group planting of flower plants or the like which is mounted on a pole, comprising a flower pot body having planting openings of which upper part is opened and provided in a plurality of locations in the periphery of said body, and having a hole provided in the bottom of said body for inserting said pole; and a cylindrical mounting member for inserting the upper part of said pole, at least the bottom of said mounting member being opened and said mounting member being removably mounted vertically around said hole.

BEST MODE FOR CARRYING THE INVENTION

Figure 1:
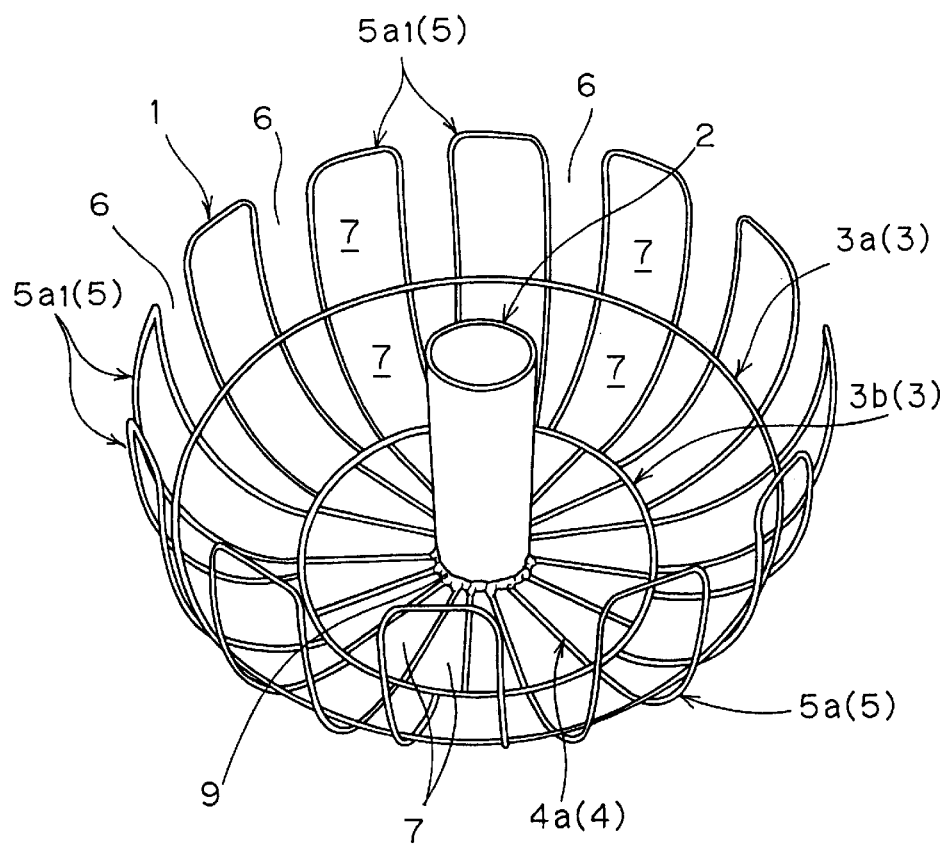
FIG. 1 is a perspective view showing the first embodiment of this invention.
Figure 2:
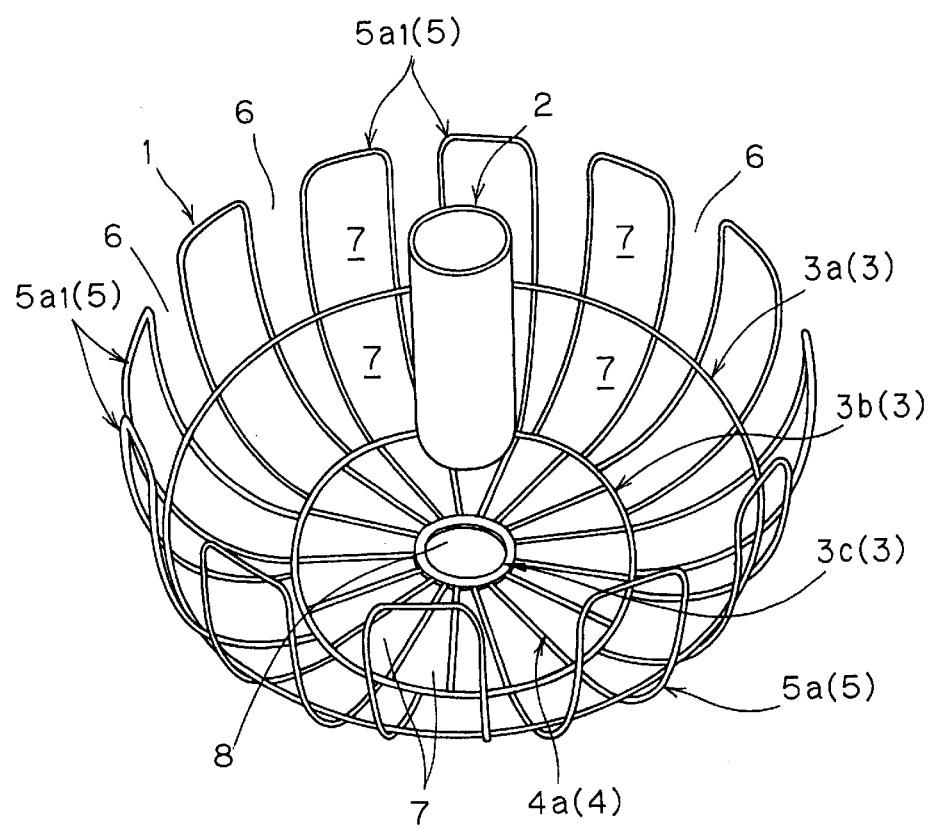
FIG. 2 is a developed perspective view of the embodiment of FIG. 1.
Figure 3:
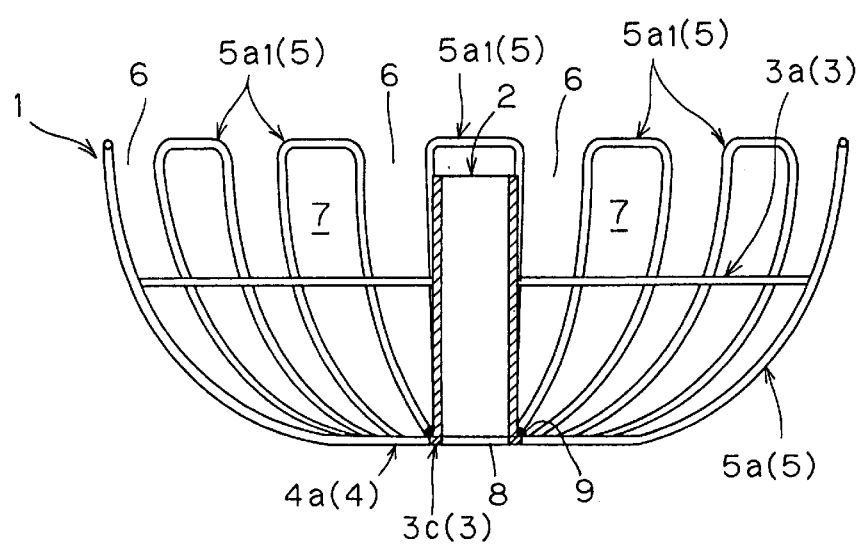
FIG. 3 is an axial sectional view of FIG. 1.

An embodiment of this invention will now be described with reference to the drawings in which FIGS. 1 to 3 show the first embodiment of the invention. In this embodiment, the flower pot for group planting of flower plants or the like which is mounted on a pole comprises a flower pot body (1) for group planting of flower plants or the like, and a cylindrical mounting member (2) mounted vertically on the bottom of the body (1).

The flower pot body (1), in this embodiment, is formed by a basket formed by wires and comprises a ring frame (3) for keeping the entire body (1) in a large bowel shape, which is formed by three thick and strong wire rings with different diameters, namely a ring frame (3a) with a large diameter, a ring frame (3b) with a medium diameter arranged under the ring frame (3a), and a ring frame (3c) with a small diameter arranged centrally in the bottom; a bottom frame (4) which is formed by a plurality of wire bars (4a)—(4a) radially connecting the medium diameter ring frame (3b) and small diameter ring frame (3b) by welding; and a peripheral frame (5) formed by a plurality of bent wires (5a)—(5a) which are formed by bending wires in a reversed U-shape and arranged longitudinally around the ring frames (3a) and (3b) with predetermined intervals and connected to the ring frames (3a) and (3b) at each cross point by welding. The bent part (5a1) of each of the bent wires (5a) is projected upward from the upper ring frame (3a) and planting openings (6)—(6) for flower plants or like of which upper part is opened, are defined between the bent parts (5a1).

Thus, the flower pot body (1) has a plurality of planting openings (6)—(6) in its periphery, many through openings (7)—(7) in its entire periphery, and an insertion hole (8) centrally in the bottom through which the upper part of a pole (P) mentioned below is inserted. The insertion hole (8) is surrounded by the ring frame (3c).

The cylindrical mounting member (2), in this embodiment, consists of a steel cylinder whose top and bottom are opened, and has an outer diameter suitable for being mounted vertically on the small diameter ring frame (3c) of the flower pot body (1), and has a height nearly equal to the depth of the flower pot body (1).

The cylindrical mounting member (2) is placed on the small diameter ring frame (3c) arranged centrally in the bottom of the flower pot body (1) constructed as above described, and in this embodiment, the periphery of the cylindrical mounting member (2), at its portion placed on the small diameter ring frame (3c), is vertically fixedly mounted (9) to the small diameter ring frame (3c) by welding so as to form a flower pot for group planting flower plants or the like which is mounted on a pole.

Figure 4:
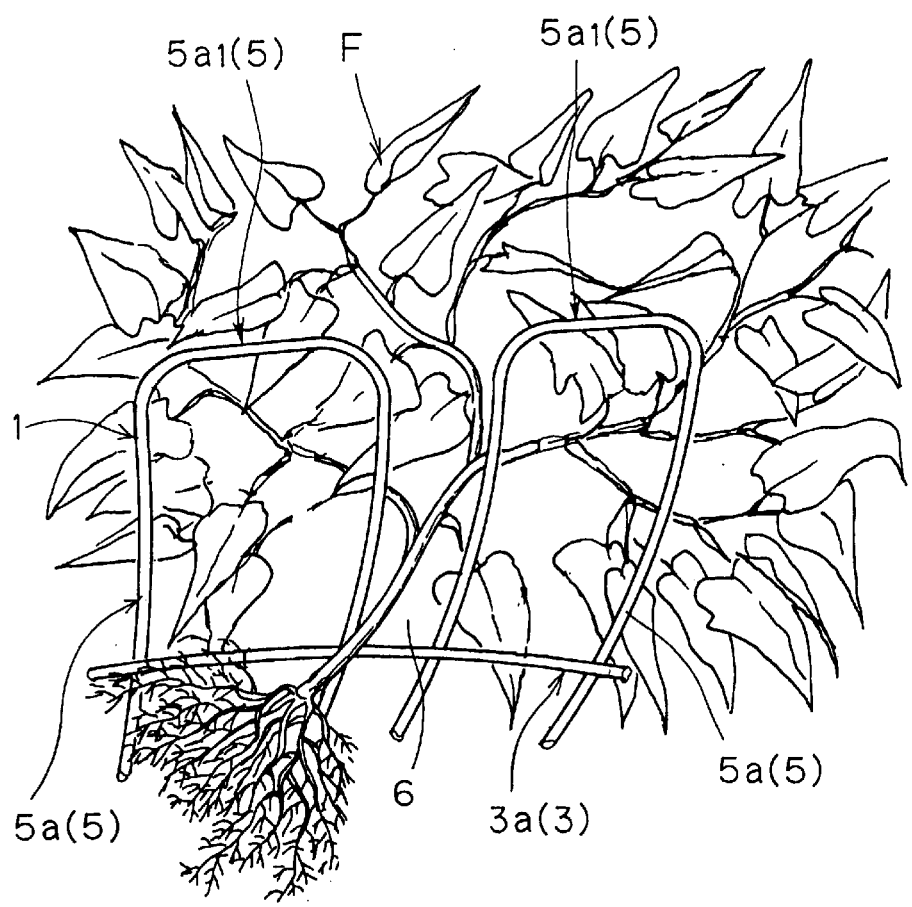
FIG. 4 is an illustration showing a flower plant as planted in the flower pot.

How to use the first embodiment of this invention constructed as described above will now be explained with its function and effect. At first, though not shown in the drawings, a sheet or sheets or the like having slits for planting formed correspondingly with the positions of the respective planting openings (6) and preventing nutritious soil or the like from falling is or are laid inside the flower pot body (1). Then, as illustrated roughly in FIG. 4, the flower plants (F) are inserted from the upper opened portions of the planting openings (6) so that the root portions of the flower plants (F) are positioned inside the flower pot body (1) while the flower portions of the flower plants (F) are positioned outside the flower pot body (1), and then a required amount of nutritious soil is filled for competing group planting.

Figure 5:
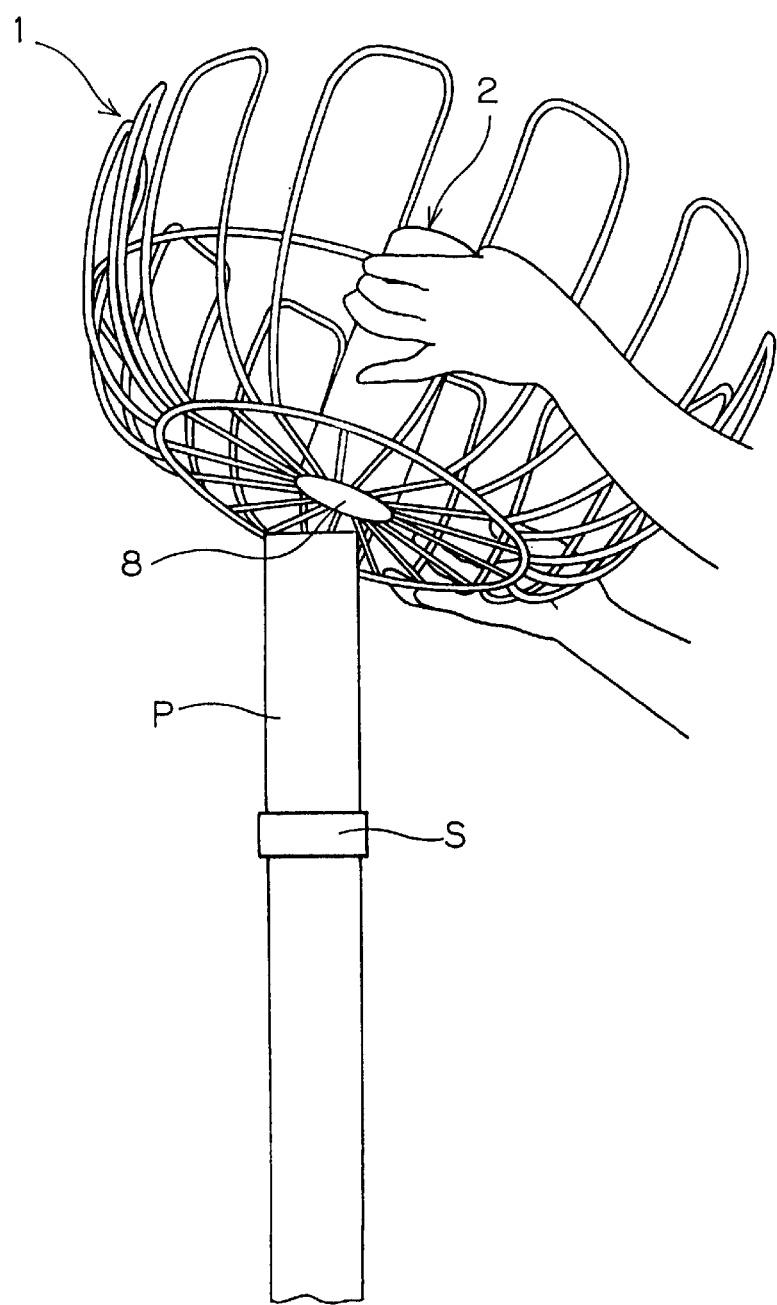
FIG. 5 is a partially omitted illustration showing the state wherein the flower pot is being mounted on the upper part of a pole.
Figure 6:
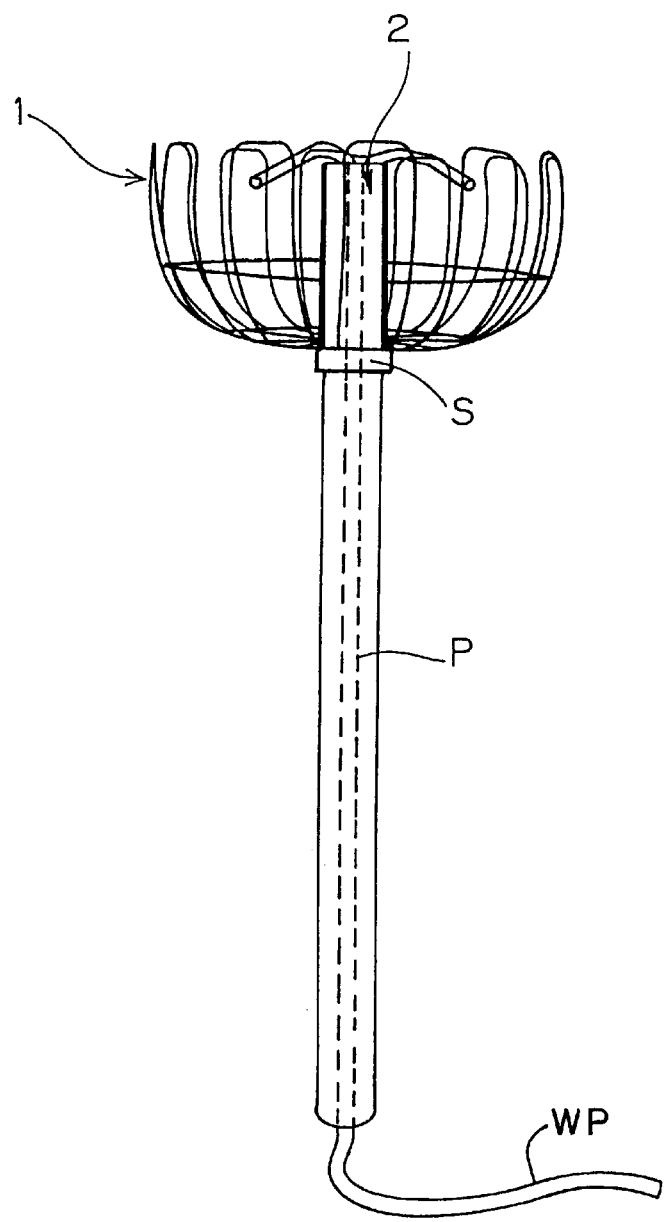
FIG. 6 is a partially omitted front view showing the state wherein the flower pot has been mounted on the upper part of a pole.
Figure 7:
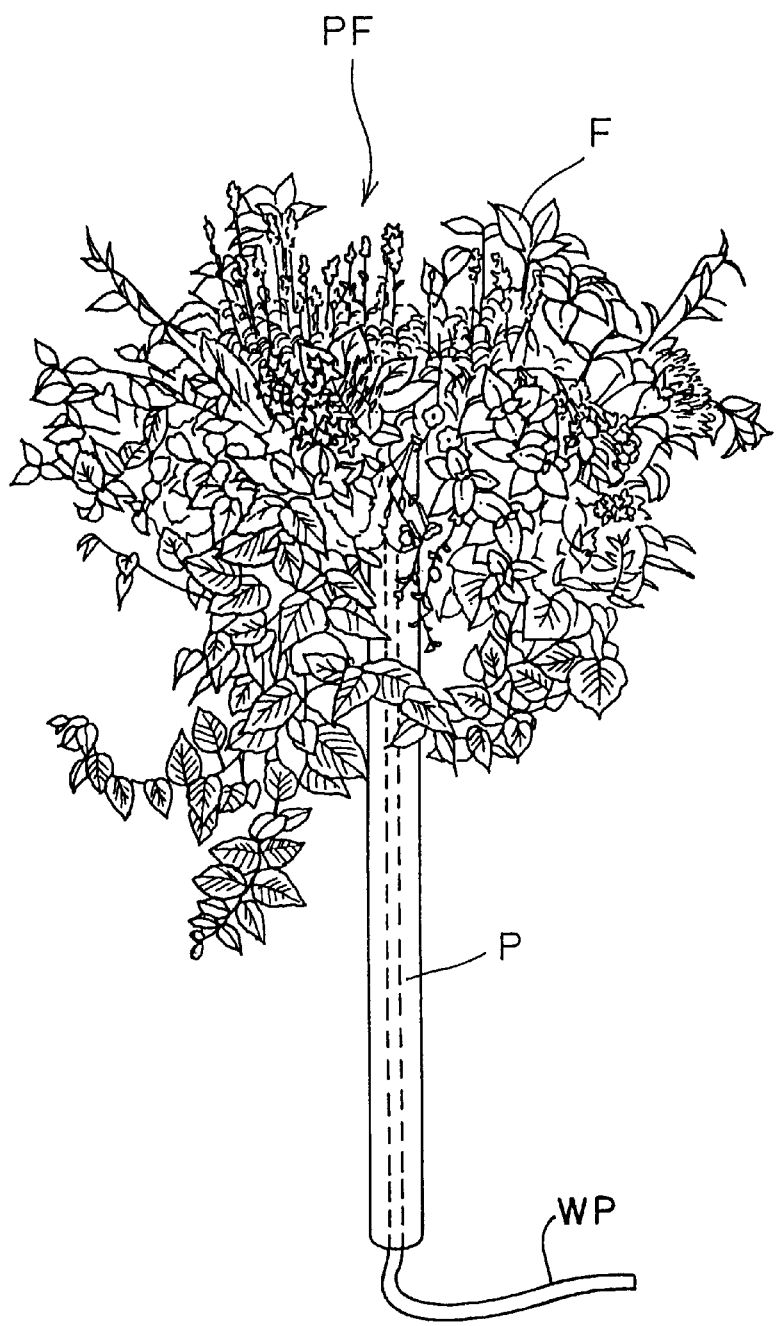
FIG. 7 is a front view showing a pole-supported flower.

Then, as shown in FIGS. 5 and 6 in which the flower plants are not shown, the cylindrical mounting member (2) fixedly mounted vertically on the flower pot body (1) is fitted on the upper part of a cylindrical steel pole (P) which is vertically installed on the street or the like and which, for instance, has opened top and bottom and a length nearly equal to human height, and placed on a stopper (S) which is fitted on and welded to the upper part of the pole (P). Thus, a beautiful pole-supported flower (PF) having a number of flower plants (F) planted in a group is obtained as shown in FIG. 7.

The pole-supported flower (PF) formed as described above has an advantage that the outer face of the flower pot body (1) is covered with the flower plants planted in a group and is not exposed so that the outer face of the flower pot body (1) does not mismatch with the beautiful flower plants (F), and decoration effect for the streets or the like is not decreased at all by the pole-supported flower (PF) even when it is positioned at a level nearly equal to the level of the pedestrian's eye, and accordingly the pole-supported flower (PF) remarkably contributes to beautification of the streets.

In addition, the flower pot for group planting of this pole-supported flower (PF) has an advantage that there is no fear that the flower pot falls from the pole (P) even when subjected to strong winds because the cylindrical mounting member (2) fixedly mounted vertically on the flower pot body (1) is fitted on the upper part of the pole (P), and accordingly the flower pot is not broken, the flower plants (F) are not scattered and pedestrians are not injured.

In this embodiment, a cylindrical mounting member (2) opened at its top and bottom is used and it is fitted on a cylindrical pole (P) opened at its top and bottom to mount the flower pot for group planting on the pole (P). Therefore, though not shown in the drawings, it has a further advantage that, it is easily possible to insert through the pole (P) a water supply tube of a known automatic sprinkler having a controller and connected to a water service pipe for timely sprinkling water, to branch off a plurality of sprinkling tubes from the upper part of the water supply tube and to place the tip ends of the sprinkling tubes in faced relation to the inner upper portion of the flower pot so that withering and blasting of the group planted flower plants (F) are securely prevented.

Figure 8:
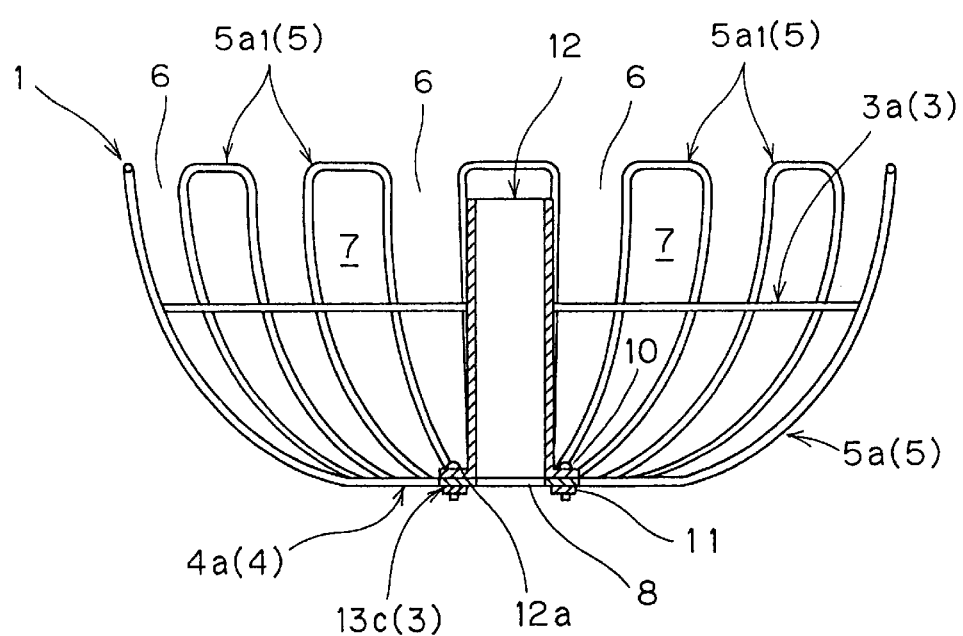
FIG. 8 is an axial sectional view showing only main part of the second embodiment of this invention.

FIG. 8 shows a main part of the second embodiment of this invention. This embodiment is different from the first embodiment in means for mounting the cylindrical mounting member on the flower pot body (1). More particularly, the second embodiment is different from the first embodiment only in that a use is made of a cylindrical mounting member (12) having a flange (12a) around the periphery of the lower end and opened at its top and bottom, the flange (12a) is placed on the upper surface of a small diameter ring frame (13c) formed by a narrow steel plate and arranged centrally in the bottom of the flower pot body (1), and the flange (12a) and the small diameter ring frame (13c) are secured to each other at a plurality of positions with bolts (10) and nuts (11), thereby the cylindrical mounting member (12) is removably mounted vertically on the flower pot body (1).

The second embodiment of this invention has an economical advantage that it is unnecessary to replace the entire flower pot but either one of the flower pot body (1) or the cylindrical mounting member (12) may be replaced when either one becomes unusable for some reasons.

The construction, function and advantages of the second embodiment in other respects are the same as those of the first embodiment, and therefore, the same reference numerals are applied to the same elements and unnecessary illustrations are all omitted.

This invention has been described with reference to the typical embodiments. This invention, however, is not limited to these embodiments but various modifications may be made without departing from the spirit of the invention subject to achieve the object of the invention. Then these modifications will fall within the scope of the claims.

For example, as the materials for the flower pot body (1) and the cylindrical mounting member (2), uses can be made of other materials than the wire or steel pipe mentioned above, e.g. formed plastic articles or natural materials such as thin rods, plates, bamboo, etc., or synthetic materials imitating such natural materials or combinations of them. Furthermore, as means for mounting the cylindrical mounting member to the flower pot body (1), screwing in or press fitting may be also used.

As described above, the present invention provides a flower pot for group planting of flower plants or the like which is mounted on a pole, comprising a flower pot body having planting openings of which upper part is opened and provided in a plurality of locations in the periphery of said body, and having a hole provided in the bottom of said body for inserting said pole; and a cylindrical mounting member for inserting the upper part of said pole, at least the bottom of said mounting member being opened and said mounting member being fixedly or removably mounted vertically around said hole and the flower pot is used as described above so that the following remarkable advantages are brought about by this invention.

(1) Like the conventional flower pots for group planting, a pole-supported group planted flower for being mounted on the pole can be formed easily in a simple manner with a use of a plurality of planting openings provided in the periphery of the flower pot body and having an opened upper part.

(2) The group planted pole-supported flower as mounted on the pole does not present mismatching between the outer face of the flower pot body and the beautiful flower plants because the outer face of the flower pot body is covered with the flower plants planted in a group and is not exposed so that decoration effect for the streets or the like is not decreased at all by the pole-supported flower even if the level of the pole-supported flower is nearly equal to the level of the pedestrian's eyes, and accordingly the pole-supported flower remarkably contributes to the beatification of the streets.

(3) In this flower pot for group planting, there is no fear that the flower pot falls from the pole even when subjected to strong winds because the cylindrical mounting member fixedly or removably mounted vertically on the flower pot body is fitted on the upper part of the pole, and accordingly there is a safety that the flower pot is not broken, the flower plants are not scattered and pedestrians are not injured.

(4) In case wherein a cylindrical mounting member opened at its top and bottom is used and it is fitted on the upper part of a cylindrical pole opened at its top and bottom, it is easily possible to insert through the pole a water supply tube of a known automatic sprinkler having a controller and connected to a water service pipe for timely sprinkling water, to branch off a plurality of sprinkling tubes from the upper part of the water supply tube and to arrange the sprinkling tubes in faced relation to the inner upper portion of the flower pot so that withering and blasting of the group planted flower plants are securely prevented by the automatic sprinkling.

What is claimed is:

1. A device for displaying a group plants, said device comprising:
    a pot for holding the group of plants, said pot including a cylindrical mounting member and a pot body having a plurality of planting openings and a hole provided in a bottom portion of said pot body, wherein said cylindrical mounting member has opposite open ends and extends upwardly from said hole to a height that is approximately equal to a depth of said pot body;
    a pole having an upper portion that extends through said hole and is received in said cylindrical mounting member;
    a stopper provided on the upper portion of said pole for supporting the bottom of said pot body; and
    a water supply tube extending through an interior portion of said pole and having a discharge portion for supplying water through the open upper end of said cylindrical mounting member to the group of plants, said water supply tube being connectable to a water supply.

2. The device as claimed in claim 1, wherein said cylindrical mounting member is permanently fixed around said hole.

3. The device as claimed in claim 1, wherein said cylindrical mounting member is removably mounted around said hole.

4. The device as claimed in claim 1, wherein said pot body is formed by wires in a basket shape.

5. The device as claimed in claim 1, wherein said planting openings are distributed at regular intervals around an entire periphery of said pot body.

6. The device as claimed in claim 5, wherein said wires define a plurality of through openings, and each of said through openings is positioned between a pair of said planting openings.

7. The device as claimed in claim 1, wherein said hole is centrally positioned in the bottom of said pot body.

8. The device as claimed in claim 1, wherein said hole of said pot body is defined by a frame ring that is arranged centrally in the bottom of said pot body, and a bottom end of said cylindrical mounting member is mounted on said frame ring.

9. The device as claimed in claim 1, wherein said cylindrical mounting member is welded in place around said hole.

10. The device as claimed in claim 1, wherein said cylindrical mounting member includes a flange projecting radially outwardly from a lower end of said cylindrical mounting member, and said flange is secured around said hole by nuts and bolts.

11. The device as claimed in claim 1, wherein said water supply tube comprises a discharge portion having a plurality of sprinkling tubes extending radially outwardly relative to said cylindrical mounting member so that outlet ends of said sprinkling tubes oppose an upper inner peripheral portion of said pot body.

* * * * *